(12) United States Patent
Qi et al.

(10) Patent No.: US 12,017,665 B2
(45) Date of Patent: Jun. 25, 2024

(54) SYSTEMS AND METHODS FOR DETECTING MISBEHAVIOR BEHAVIOR AT AN AUTONOMOUS DRIVING SYSTEM

(71) Applicant: GM Global Technology Operations LLC, Detroit, MI (US)

(72) Inventors: Wenyuan Qi, Shanghai (CN); Kemal Ertugrul Tepe, Huntington Woods, MI (US); Mohammad Naserian, Windsor (CA); Tianxiang Cao, Shanghai (CN); Zhengyu Xing, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 17/681,063

(22) Filed: Feb. 25, 2022

(65) Prior Publication Data

US 2023/0286520 A1  Sep. 14, 2023

(30) Foreign Application Priority Data

Jan. 29, 2022  (CN) .......................... 202210110707.2

(51) Int. Cl.
*B60W 50/02* (2012.01)
*B60W 50/00* (2006.01)
(Continued)

(52) U.S. Cl.
CPC .... *B60W 50/0205* (2013.01); *B60W 50/0098* (2013.01); *G07C 5/008* (2013.01);
(Continued)

(58) Field of Classification Search
None
See application file for complete search history.

(56) References Cited

U.S. PATENT DOCUMENTS

| 2017/0132922 A1 | 5/2017 | Gupta et al. |
| 2019/0285726 A1* | 9/2019 | Muto ......................... G01S 7/40 |

(Continued)

FOREIGN PATENT DOCUMENTS

| CN | 113012429 A | 6/2021 |
| DE | 102018120655 A1 | 2/2019 |

(Continued)

OTHER PUBLICATIONS

Geoff Twardokus, Targeted Discreditation Attack against Trust Management in Connected Vehicles, Aug. 6, 2021, IEEE, pp. 1-6 (Year: 2021).*

*Primary Examiner* — Justin S Lee
(74) *Attorney, Agent, or Firm* — Vivacqua Crane, PLLC

(57) ABSTRACT

An automated driving system (ADS) of an autonomous vehicle includes a communication module, a perception module, a misbehavior detection module, and a processor. The communication module is configured to receive a vehicle-to-vehicle (V2V) message comprising message-based vehicle data. The perception module configured to receive sensor data from at least one vehicle sensing device. The misbehavior detection module is configured to determine whether the V2V message is one of a legitimate message and a malicious message based at least in part on a comparison of the message-based vehicle data with sensor-based vehicle data generated based on the sensor data. The processor is configured to manage performance of the autonomous vehicle in accordance with the message-based vehicle data based on the determination. Other embodiments are described and claimed.

16 Claims, 4 Drawing Sheets

(51) Int. Cl.
    *G07C 5/00*     (2006.01)
    *H04W 12/121*   (2021.01)
(52) U.S. Cl.
    CPC .. *H04W 12/121* (2021.01); *B60W 2050/0215* (2013.01); *B60W 2556/65* (2020.02)

(56) References Cited

U.S. PATENT DOCUMENTS

| | | |
|---|---|---|
| 2020/0017114 A1* | 1/2020 | Santoni ............. B60W 50/0205 |
| 2020/0105131 A1 | 4/2020 | Carter et al. |
| 2020/0137580 A1* | 4/2020 | Yang .................... H04W 12/06 |
| 2020/0334978 A1 | 10/2020 | Pittman et al. |
| 2022/0256333 A1* | 8/2022 | Whyte ............. H04W 12/0471 |
| 2023/0122124 A1 | 4/2023 | Vassilovski et al. |
| 2023/0154248 A1* | 5/2023 | Das .................... H04W 12/126 701/31.4 |
| 2023/0154249 A1* | 5/2023 | Das ....................... G06V 20/56 701/31.4 |
| 2023/0156621 A1 | 5/2023 | Shuman et al. |
| 2023/0174097 A1 | 6/2023 | Kakuta |
| 2023/0242152 A1 | 8/2023 | Qi et al. |
| 2023/0316920 A1 | 10/2023 | Cairano et al. |
| 2023/0322259 A1 | 10/2023 | Sadek et al. |
| 2023/0345249 A1 | 10/2023 | Ansari et al. |
| 2023/0354002 A1 | 11/2023 | Shuman et al. |

FOREIGN PATENT DOCUMENTS

| | | |
|---|---|---|
| DE | 102019111387 A1 | 11/2019 |
| DE | 112017007393 | 12/2019 |
| DE | 102020102426 A1 | 9/2020 |

* cited by examiner

SYSTEMS AND METHODS FOR DETECTING MISBEHAVIOR BEHAVIOR AT AN AUTONOMOUS DRIVING SYSTEM

INTRODUCTION

The technical field generally relates to autonomous vehicles, and more particularly relates to systems and methods for detecting malicious vehicle-to-vehicle (V2V) messages at an autonomous driving system.

Autonomous vehicles are typically configured to receive vehicle-to-vehicle (V2V) messages from other autonomous vehicles. A V2V message includes a vehicle identifier and vehicle data associated with the transmitting vehicle. Automated driving systems (ADS) of autonomous vehicles often rely on the vehicle data contained in V2V messages received from other autonomous vehicles to properly guide and navigate the autonomous vehicle.

A malicious entity may send a malicious V2V message that appears to be a legitimate V2V message via a wireless communication channel to an autonomous vehicle. The malicious entity may seek to appear as another autonomous vehicle that does not actually exist. The non-existent autonomous vehicle may be referred to as a ghost vehicle. The malicious V2V message may include malicious vehicle data associated with the ghost vehicle.

The ADS at an autonomous vehicle may rely on malicious vehicle data in received malicious V2V messages to implement one or more actions that could potentially lead to degradation in traffic related guidance efficiencies or implementation of maneuvers to avoid non-existent ghost vehicles that may lead to potential accidents. It may be beneficial for an ADS to be able to identify malicious V2V messages in order to avoid use of malicious vehicle data that may impact the ability of the ADS to appropriately guide and navigate an autonomous vehicle.

SUMMARY

In an embodiment, an automated driving system (ADS) of an autonomous vehicle includes a misbehavior detection system. The ADS includes a communication module, a perception module, a misbehavior detection module, and a processor. The communication module is configured to receive a vehicle-to-vehicle (V2V) message comprising message-based vehicle data. The perception module configured to receive sensor data from at least one vehicle sensing device. The misbehavior detection module is configured to determine whether the V2V message is one of a legitimate message and a malicious message based at least in part on a comparison of the message-based vehicle data with sensor-based vehicle data generated based on the sensor data. The processor is configured to manage performance of the autonomous vehicle in accordance with the message-based vehicle data based on the determination.

In an embodiment, the message-based vehicle data comprises a vehicle location of a source vehicle of the V2V message and the sensor-based vehicle data comprises a sensor-based vehicle location of the source vehicle based on the sensor data.

In an embodiment, the misbehavior detection module is configured to determine whether the V2V message is one of the legitimate message and the malicious message based at least in part on performance of a plausibility check of based of the message-based vehicle data.

In an embodiment, the message-based vehicle data comprises a vehicle location of a source vehicle of the V2V message, and the misbehavior detection module is configured to determine whether the vehicle location of the source vehicle is disposed within a sensor detection area associated with the at least vehicle sensing device; and perform a sensor operation check of the at least one vehicle sensing device based on the determination.

In an embodiment, the message-based vehicle data comprises a vehicle location of a source vehicle of the V2V message, and the misbehavior detection module is configured to determine whether the vehicle location of the source vehicle is disposed within a sensor detection area associated with the at least vehicle sensing device; and compare the vehicle location of the source vehicle received in the V2V message with historical source vehicle location data to identify whether the V2V message is one of the legitimate message and the malicious message based on the determination.

In an embodiment, the message-based vehicle data comprises a vehicle location of a source vehicle of the V2V message, and the misbehavior detection module is configured to determine whether the vehicle location of the source vehicle is disposed within a sensor detection area associated with the at least vehicle sensing device; and compare a reputation score received from a security credentials management system (SCMS) and associated with a vehicle identifier associated with the V2V message with a reputation score threshold to identify whether the V2V message is one of the legitimate message and the malicious message based on the determination.

In an embodiment, upon a determination that the V2V message is the malicious message, a misbehavior reporting module is configured to report a vehicle identifier associated with the V2V message to a SCMS.

In an embodiment, a computer readable medium comprising instructions stored thereon for detection of misbehavior at an automated driving system (ADS), that upon execution by a processor, cause the processor to receive a vehicle-to-vehicle (V2V) message comprising message-based vehicle data; receive sensor data received from at least one vehicle sensing device; determine whether the V2V message is one of a legitimate message and a malicious message based at least in part on a comparison of the message-based vehicle data with sensor-based vehicle data generated based on the sensor data; and manage performance of an autonomous vehicle in accordance with the message-based vehicle data based on the determination.

In an embodiment, the computer readable medium further includes instructions to cause the processor to determine whether the V2V message is one of the legitimate message and the malicious message based at least in part on a comparison of the message-based vehicle data with the sensor-based vehicle data generated based on the sensor data, the message-based vehicle data comprising a vehicle location of a source vehicle of the V2V message and the sensor-based vehicle data comprising a sensor-based vehicle location of the source vehicle based on the sensor data.

In an embodiment, the computer readable medium further includes instructions to cause the processor to determine whether the V2V message is one of the legitimate message and the malicious message based at least in part on performance of a plausibility check of the message-based vehicle data.

In an embodiment, the computer readable medium, further includes instructions to cause the processor to determine whether a vehicle location of a source vehicle is disposed within a sensor detection area associated with the at least vehicle sensing device, the message-based vehicle data comprising a vehicle location of the source vehicle of the V2V message; and perform a sensor operation check of the at least one vehicle sensing device based on the determination.

In an embodiment, the computer readable medium, further includes instructions to cause the processor to determine whether a vehicle location of a source vehicle is disposed within a sensor detection area associated with the at least vehicle sensing device, the message-based vehicle data comprising a vehicle location of the source vehicle of the V2V message; and compare the vehicle location of the source vehicle received in the V2V message with historical source vehicle location data to identify whether the V2V message is one of the legitimate message and the malicious message based on the determination.

In an embodiment, the computer readable medium, further includes instructions to cause the processor to determine whether a vehicle location of a source vehicle is disposed within a sensor detection area associated with the at least vehicle sensing device, the message-based vehicle data comprising a vehicle location of the source vehicle of the V2V message; and compare a reputation score received from a security credentials management system (SCMS) and associated with a vehicle identifier associated with the V2V message with a reputation score threshold to identify whether the V2V message is one of the legitimate message and the malicious message based on the determination.

In an embodiment, the computer readable medium, further includes instructions to cause the processor to upon a determination that the V2V message is the malicious message, report a vehicle identifier associated with the V2V message to a SCMS In an embodiment, a method of detecting misbehavior at an automated driving system (ADS) includes receiving a vehicle-to-vehicle (V2V) message comprising message-based vehicle data at a communication module; receiving sensor data received from at least one vehicle sensing device at a perception module; determining whether the V2V message is one of a legitimate message and a malicious message based at least in part on a comparison of the message-based vehicle data with sensor-based vehicle data generated based on the sensor data at a misbehavior detection module; and managing performance of an autonomous vehicle in accordance with the message-based vehicle data based on the determination.

In an embodiment, the method further includes determining whether the V2V message is one of the legitimate message and the malicious message based at least in part on a comparison of the message-based vehicle data with the sensor-based vehicle data generated based on the sensor data, the message-based vehicle data comprising a vehicle location of a source vehicle of the V2V message and the sensor-based vehicle data comprising a sensor-based vehicle location of the source vehicle based on the sensor data.

In an embodiment, the method further includes determining whether the V2V message is one of the legitimate message and the malicious message based at least in part on performance of a plausibility check of the message-based vehicle data.

In an embodiment, the method further includes determining whether a vehicle location of a source vehicle is disposed within a sensor detection area associated with the at least vehicle sensing device, the message-based vehicle data comprising a vehicle location of the source vehicle of the V2V message; and performing a sensor operation check of the at least one vehicle sensing device based on the determination.

In an embodiment, the method further includes determining whether a vehicle location of a source vehicle is disposed within a sensor detection area associated with the at least vehicle sensing device, the message-based vehicle data comprising a vehicle location of the source vehicle of the V2V message; and comparing the vehicle location of the source vehicle received in the V2V message with historical source vehicle location data to identify whether the V2V message is one of the legitimate message and the malicious message based on the determination.

In an embodiment, the method further includes determining whether a vehicle location of a source vehicle is disposed within a sensor detection area associated with the at least vehicle sensing device, the message-based vehicle data comprising a vehicle location of the source vehicle of the V2V message; and comparing a reputation score received from a security credentials management system (SCMS) and associated with a vehicle identifier associated with the V2V message with a reputation score threshold to identify whether the V2V message is one of the legitimate message and the malicious message based on the determination.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
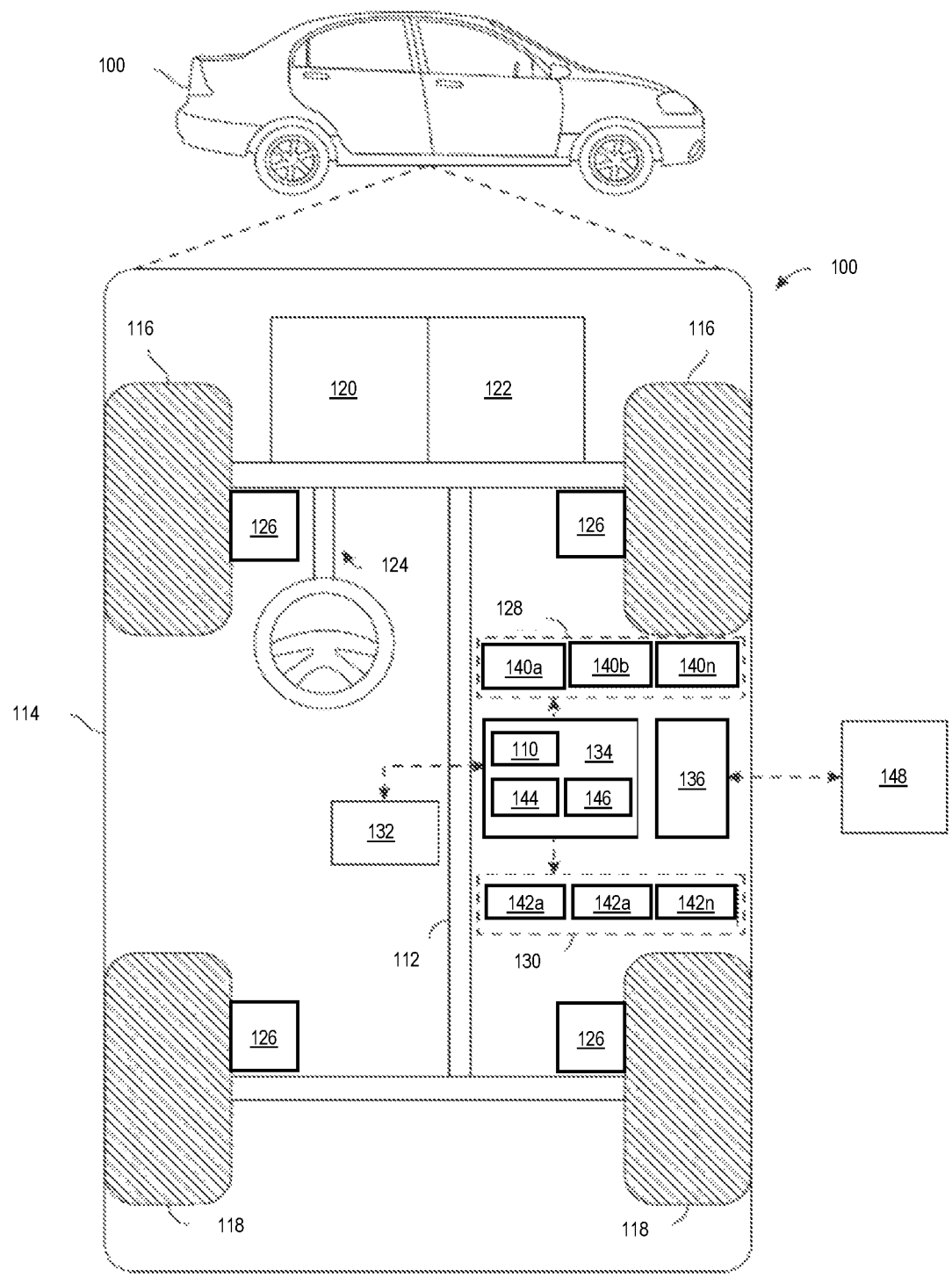
FIG. 1 is a functional block diagram representation of an autonomous vehicle including an embodiment of a misbehavior detection system.

Referring to FIG. 1 a functional block diagram representation of an autonomous vehicle 100 including an embodiment of a misbehavior detection system 110 is shown. The misbehavior detection system 110 is configured to detect misbehavior in vehicle-to-vehicle messaging scenarios. The misbehavior detection system 110 is configured to compare vehicle data received in a vehicle-to-vehicle (V2V) message with vehicle data generated based on sensor data received from the vehicle sensor system to determine whether the received V2V message is a legitimate V2V message or a malicious V2V message. In an embodiment, the vehicle data is a vehicle location of the source vehicle that transmitted the V2V message. If the misbehavior detection system 110 identifies an inconsistency between the vehicle location in the V2V message and the vehicle location based on the sensor data, the misbehavior detection system 110 determines that the received V2V is a malicious message.

The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities 148 ("vehicle-to-everything (V2X) communication), such as for example, but not limited to, other vehicles ("V2V" communication,) infrastructure ("vehicle-to-infrastructure (V2I)" communication), remote systems, and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of the misbehavior behavior detection system 110. The processor 144 can be any custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described with reference to one or a combination of embodiments of the misbehavior detection system 110.

Figure 2:
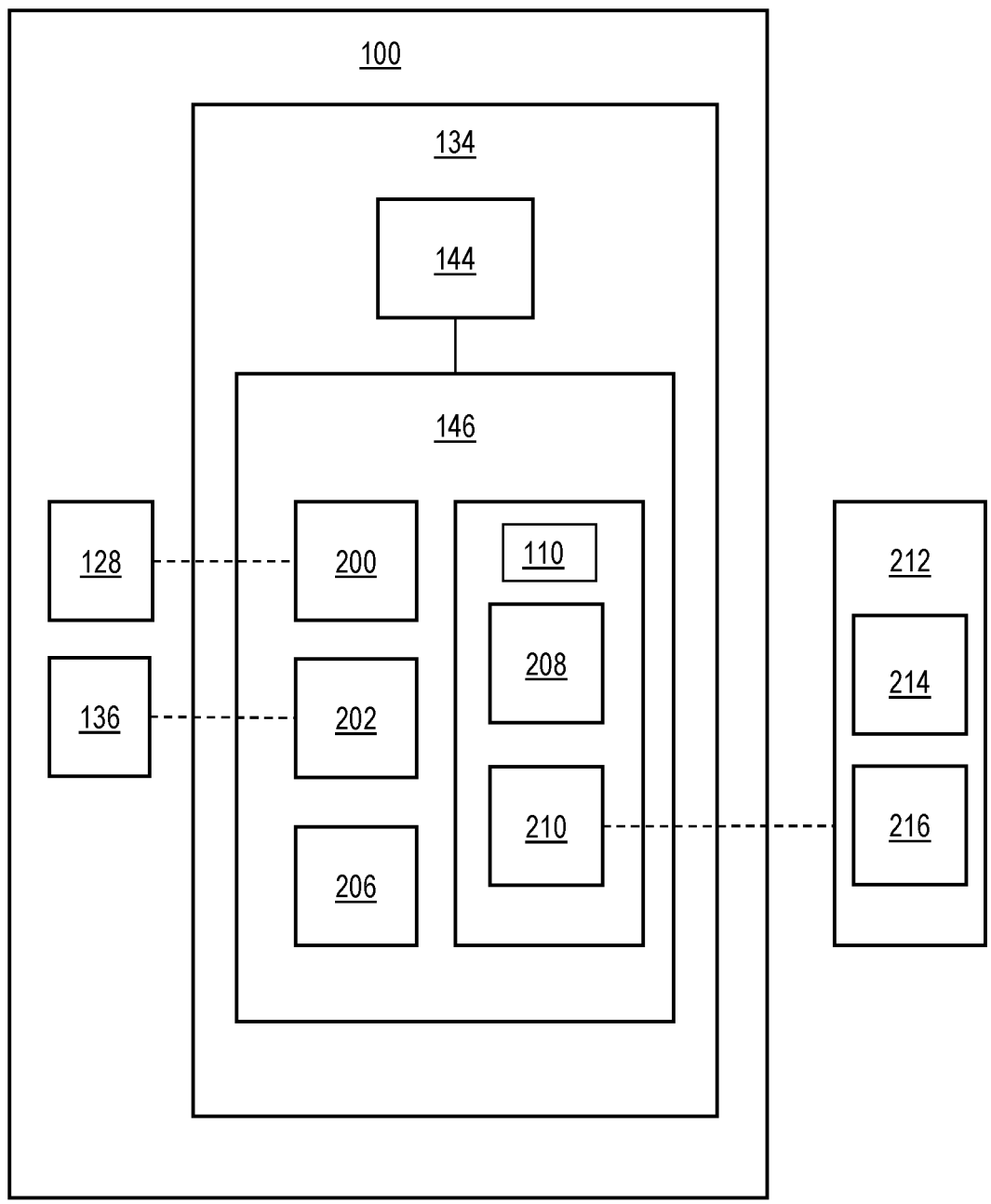
FIG. 2 is a functional block diagram representation of a controller including an embodiment of a misbehavior detection system.

Referring to FIG. 2 a functional block diagram representation of a controller 134 including an embodiment of a misbehavior detection system 110 is shown. The controller 134 is configured to be communicatively coupled to the vehicle sensor system 128 and the vehicle communication system 136. In an embodiment, the controller 134 is configured to be communicatively coupled to a security credentials management system (SCMS) 212. In an embodiment, the SCMS 212 is located at a back-end office. In an embodiment, the SCMS 212 is located at an edge computing cluster. The SCMS 212 includes a certificate authority (CA) 214 and a misbehavior authority 216, The vehicle sensor system 128 includes one or more vehicle sensing devices 140a-140n that are configured to generate sensor data based on the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors.

The vehicle communication system 136 is configured to wirelessly communicate information to and from other entities 148. An example of an entity 148 is another autonomous vehicle. An example of wireless communications to and from another vehicle is V2V communications with other vehicles. An example of a V2V communication is a V2V message. In an embodiment, the communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. The vehicle communication system 136 is configured to receive V2V messages from other autonomous vehicles. The autonomous vehicle that the V2V message is transmitted from to the autonomous vehicle 100 can be referred to as a source vehicle. In an embodiment, the V2V message is a Basic Safety Message (BSM).

In an embodiment, the controller 134 implements the ADS in the autonomous vehicle 100. That is, suitable software and/or hardware components of controller 134 (e.g., the processor 144 and the computer-readable storage device 146) are utilized to provide an ADS that is used in conjunction with other components of the autonomous vehicle 100. In an embodiment, the instructions of the ADS are organized by function or system. In an embodiment, the misbehavior detection system 110 described herein and its functions are part of the ADS and implement at least a part of the functions of the ADS. The ADS includes additional components (not shown) that facilitate operation of the autonomous vehicle 100. The controller 134 is configured to be communicatively coupled to other components of the autonomous vehicle 100 (not shown) to facilitate operation of the ADS.

The controller 134 includes at least one processor 144 and a memory 146. The memory 146 is also referred to as a computer readable storage device, computer readable media, or computer readable medium. In an embodiment, the memory 146 includes an embodiment of the misbehavior detection system 110, a perception module 200, and a communication module 202. In an embodiment, the memory 146 includes an embodiment of the misbehavior detection system 110, a perception module 200, a communication module 202, and a historical data module 206. In an embodiment, the historical data module 206 is a component of the controller 134. In an embodiment, the historical data module 206 is a component of the data storage device 132.

The perception module 200 is configured to receive sensor data from one or more vehicle sensing devices 140a-140n of the vehicle sensor system 128. In an embodiment, the perception module 200 is configured to generate sensor-based vehicle data based on the sensor data. An example of sensor-based vehicle data is sensor-based vehicle locations of different vehicles within a sensor detection area of vehicle sensor system 128. The historical data module 206 is configured to store historical sensor-based vehicle data generated by vehicle sensor system 128. An example of historical sensor-based vehicle data is historical source vehicle location data.

The vehicle communication system 136 is configured to receive V2X messages. An example of a V2X communication is a V2V message. The communication module 202 is configured to process the V2V messages received from source vehicles. The communication module 202 is configured to process received V2V communications in accordance with a physical layer (PHY), a media access control (MAC), and a wave short message protocol (WSMP) associated with the received V2V communications.

In an embodiment, the communication module 202 includes a security services layer. In an embodiment, the communication module 202 includes an IEEE 1609.2 security services layer. The security services layer is configured to determine whether a certification associated with a received V2X message is an authorized or legitimate certificate.

The communication module 202 includes a V2X application. In an embodiment, the V2X application is configured to generate message-based vehicle data based on V2V messages received at the communication module 202 via the vehicle communication system 136. The message-based vehicle data includes vehicle attributes of the source vehicle. Examples of the vehicle attributes include, but are not limited to, a speed of the source vehicle, a vehicle location or position of the source vehicle, an acceleration of the source vehicle, and a heading of the source vehicle. The V2V message includes a time stamp and a vehicle identifier associated with the source vehicle.

In an embodiment, the V2X application is configured to analyze the message-based vehicle data to determine whether to there is a potential risk to the autonomous vehicle 100. The ADS uses the potential risk identified by the V2X application to implement one or more risk avoidance actions. For example, message-based vehicle data associated with a source vehicle may indicate that the source vehicle is located at an intersection. The V2X application may determine that the source vehicle poses a potential collision risk to the autonomous vehicle 100. The ADS may implement one or more actions to slow down or stop the autonomous vehicle 100 to avoid a potential collision with the source vehicle by issuing commands to the brake system 126.

In an embodiment, the misbehavior detection system 110 includes a misbehavior detection module 208. In an embodiment, the misbehavior behavior detection system 110 includes a misbehavior detection module 208 and a misbehavior reporting module 210. The misbehavior detection module 208 is configured to compare the message-based vehicle data generated by the communication module 202 with the sensor-based vehicle data generated by the perception module 200 to determine whether the V2V message is one of a legitimate message and a malicious message.

The misbehavior detection module 208 determines that the received V2V message is a legitimate message when there is a match between the message-based vehicle data based on the V2V message and the sensor-based vehicle data based on the sensor data. In an embodiment, the message-based vehicle data is a message-based vehicle location of a source vehicle identified in the V2V message and the sensor-based vehicle data is a sensor-based vehicle location of the source vehicle. The misbehavior detection module 208 determines that the received V2V message is a legitimate message when the sensor-based vehicle location confirms that an actual vehicle is present at the message-based vehicle location.

The misbehavior detection module 208 determines that the received V2V message is a malicious message when the message-based vehicle data based on the V2V message fails to match the sensor-based vehicle data based on the sensor data. In an embodiment, the message-based vehicle data is a message-based vehicle location of a source vehicle identified in the V2V message and the sensor-based vehicle data is a sensor-based vehicle location of the source vehicle. The misbehavior detection module 208 determines that the received V2V message is a malicious message when the sensor-based vehicle location fails to confirm that an actual vehicle is present at the message-based vehicle location. The malicious V2V message may be a V2V message that appears to be generated by an actual vehicle but is a V2V message generated by a malicious entity. The malicious entity may be attempting a sybil attack where the malicious V2V message is generated by a ghost vehicle or a non-existent vehicle. The misbehavior detection module 208 is configured to inform the V2X application that the received V2V message is a malicious message and to disregard the message-based vehicle data associated with the malicious message thereby ensuring that the ADS does not implement navigation and/or guidance actions based on the malicious message-based vehicle data.

The V2V message includes a vehicle identifier that identifies the source vehicle associated with the V2V message. When the misbehavior detection module 208 determines that a received V2V message is a malicious V2V message, the misbehavior detection module 208 classifies the vehicle identifier associated with the malicious V2V message as a malicious vehicle identifier. In an embodiment, the misbehavior detection module 208 is configured to inform the communication module 202 that the vehicle identifier associated with the received V2V message is a malicious vehicle identifier so that the communication module 202 identifies future received V2V messages including the malicious vehicle identifier as malicious V2V messages and disregards the message-based vehicle data associated with such malicious V2V messages.

In an embodiment, the misbehavior detection module 208 is configured to inform the misbehavior reporting module 210 that the vehicle identifier associated with a received malicious V2V message is a malicious vehicle identifier. The misbehavior reporting module 210 transmits a classification report including the malicious vehicle identifier to the SCMS 212.

In an embodiment, when the misbehavior detection module 208 classifies a vehicle identifier of a vehicle as a malicious vehicle identifier, the misbehavior detection module 208 generates a classification report including a unique identifier based on the license plate of the vehicle, vehicle features, and a V2V message or BSM identifier for the vehicle and maps the unique identifier with the classification of the vehicle as a legitimate vehicle or a malicious vehicle. The misbehavior reporting module 210 transmits the classification report to the SCMS 212.

In an embodiment, misbehavior authority 216 at the SCMS 212 receives the classification report including the malicious vehicle identifier and broadcasts the malicious vehicle identifier to the other autonomous vehicles in the vicinity of the autonomous vehicle 100 that identified the malicious vehicle identifier so that the other autonomous vehicles identify received V2V messages associated with the malicious vehicle identifier as a malicious V2V message and disregard the message-based vehicle data associated with the malicious V2V messages.

In an embodiment, the SCMS 212 maintains a record of the number of classification reports received from autonomous vehicles indicating that a vehicle identifier is a malicious vehicle identifier. The SCMS 212 calculates a reputation score associated with the vehicle identifier. The reputation score reflects a probability that a vehicle identifier is a malicious vehicle identifier. The higher the reputation score, the higher the probability that vehicle identifier is a malicious vehicle identifier.

While a number of different components of the autonomous vehicle 100 and the controller 134 are shown in FIG.

2, the autonomous vehicle 100 and/or the controller 134 may include additional components that facilitate operation of the autonomous vehicle.

Figure 3:
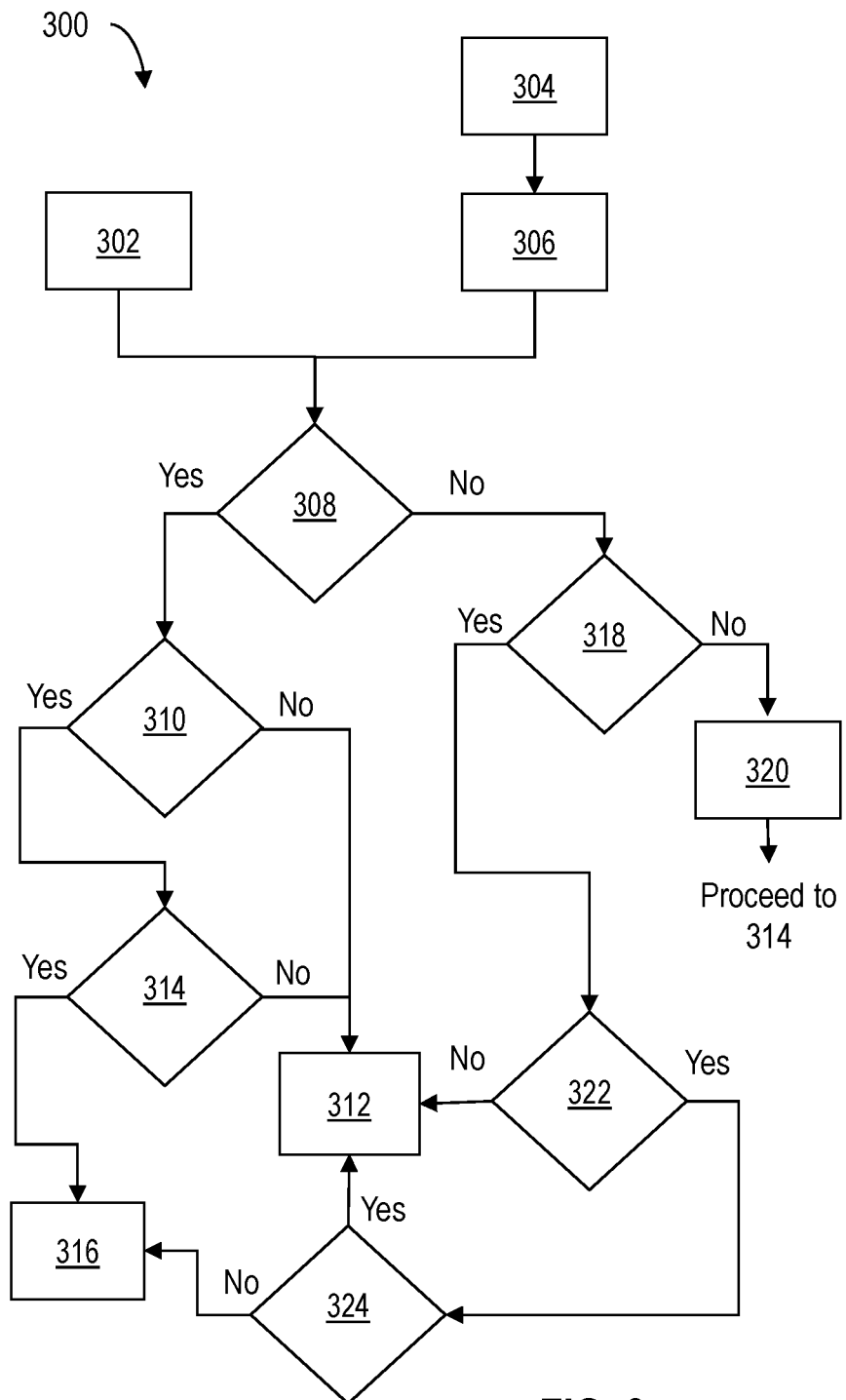
FIG. 3 is a flow chart representation of an embodiment of a method of detecting misbehavior at the automated driving system (ADS) of an autonomous vehicle.

Referring to FIG. 3, a flow chart representation of an embodiment of a method 300 of detecting misbehavior at the ADS of an autonomous vehicle 100 is shown. The method 300 is performed by a controller 134 including an embodiment of a misbehavior detection system 110. The method 300 may be performed by the controller 134 in combination with other components of the autonomous vehicle 100. The method 300 may be performed by hardware circuitry, firmware, software, and/or combinations thereof. The method is described with reference to FIG. 2.

A V2V message is received at the vehicle communication system 136 via a wireless communication channel at 302. In an embodiment, the V2V message is received at the controller 134 via the vehicle communication system 136. In an embodiment, a V2V message is received at the communication module 202 via the vehicle communication system 136. The V2V message includes a vehicle identifier associated with a source vehicle, a time stamp, and message-based vehicle data. The message-based vehicle data includes vehicle attributes of the source vehicle. Examples of the vehicle attributes include, but are not limited to, a speed of the source vehicle, a vehicle location or position of the source vehicle, an acceleration of the source vehicle, and a heading of the source vehicle. The V2V message includes a time stamp and a vehicle identifier associated with the source vehicle. The misbehavior detection module 208 receives the message-based vehicle data from the communication module 202. In an embodiment, the V2V message is a BSM message.

At 304 sensor data is received from the vehicle sensor system 128 at the perception module 200 at approximately the same time that the V2V message is received at the autonomous vehicle 100. In an embodiment, the sensor data is received from one or more vehicle sensing devices 140a-140n of the vehicle sensor system 128 at the perception module 200. Examples of vehicle sensing devices 140a-140n include, but are not limited to, radars, lidars, global positioning systems, optical cameras, thermal cameras, ultrasonic sensors, and/or other sensors. In an embodiment, the perception module 200 is configured to generate sensor-based vehicle data based on the sensor data. The misbehavior detection module 208 is configured to receive the sensor-based vehicle data from the perception module 200. In an embodiment, the misbehavior detection module 208 is configured to receive the sensor data from the perception module 200 and generate the sensor-based vehicle data based on the sensor data. The sensor-based vehicle data includes one or more sensor-based vehicle attributes associated with the source vehicle.

At 306, the misbehavior detection module 208 is configured to identify a sensor detection area associated with the vehicle sensor system 128 at approximately the time that the V2V message is received at the autonomous vehicle 100. The message-based vehicle data received in the V2V message includes a message-based vehicle location or position of the source vehicle. At 308, the misbehavior detection module 208 determines whether the message-based vehicle location of the source vehicle in the V2V message falls within the sensor detection area.

If the misbehavior detection module 208 determines at 308 that the message-based vehicle location of the source vehicle falls within the sensor detection area, the misbehavior detection module 208 is configured to determine whether the received V2V message is a legitimate message on based on a comparison of the message-based vehicle data and the sensor-based vehicle data at 310.

If the misbehavior detection module 208 determines at 310 that the message-based vehicle data does not match the sensor-based vehicle data, at 312 the misbehavior detection module 208 identifies the V2V message as a malicious message and the vehicle identifier in the V2V message as a malicious vehicle identifier. The misbehavior detection module 208 is configured to inform the V2X application that the received V2V message is a malicious message and to disregard the message-based vehicle data associated with the malicious message thereby ensuring that the ADS does not implement navigation and/or guidance actions based on the malicious message-based vehicle data.

In an embodiment, the misbehavior reporting module 210 is configured to generate a classification report that includes the malicious vehicle identifier and transmits the classification report including the malicious vehicle identifier to the SCMS 212. The misbehavior authority 216 at the SCMS 212 stores the malicious vehicle identifier at the SCMS. The misbehavior authority broadcasts the malicious vehicle identifier to the autonomous vehicles disposed within a vicinity of the autonomous vehicle 100.

In an embodiment, the message-based vehicle data is a message-based vehicle location of a source vehicle identified in the V2V message and the sensor-based vehicle data is a sensor-based vehicle location of the source vehicle. The misbehavior detection module 208 determines that the received V2V message is a malicious message when the sensor-based vehicle location fails to confirm that an actual vehicle is present at the message-based vehicle location. The malicious V2V message may be a V2V message that appears to be generated by an actual vehicle but is a V2V message generated by a malicious entity. The malicious entity may be attempting a sybil attack where the malicious V2V message is generated by a ghost vehicle or a non-existent vehicle.

If at 310 the misbehavior detection module 208 determines that the message-based vehicle data matches the sensor-based vehicle data, at 314 the misbehavior detection module 208 is configured to determine whether the received V2V message is a legitimate message based on the performance of a vehicle plausibility check of the message-based vehicle data. The vehicle plausibility check is used to determine whether the message-based vehicle data is plausible. In an embodiment, the vehicle plausibility check includes one or more of a source vehicle speed plausibility check, a source vehicle position plausibility check, a vehicle acceleration plausibility check, a vehicle sudden appearance plausibility check, a vehicle message frequency plausibility check, a vehicle heading plausibility check, and a vehicle successive message consistency plausibility check.

If the misbehavior detection module 208 determines that the message-based vehicle data does not pass the vehicle plausibility check at 314, the method 300 proceeds to 312 where the misbehavior detection module 208 implements the procedure associated with the identification of the V2V message as a malicious message as detailed above.

If the misbehavior detection module 208 determines that the message-based vehicle data has passed the vehicle plausibility check at 314, the misbehavior detection module 208 identifies the V2V message as a legitimate message at 316. Upon the identification of the V2V message as a legitimate message, the controller 134 is configured to implement ADS in the autonomous vehicle 100 in accordance with the message-based vehicle data.

If the misbehavior detection module 208 determines at 308 that the message-based vehicle location of the source vehicle in the V2V message does not fall within the sensor detection area, the misbehavior detection module 208 is configured to determine whether the vehicle sensing devices 140a-140n used to determine the sensor detection area are operational at 318. In an embodiment, the misbehavior detection module 208 is configured to issue a command to the vehicle sensor system 128 to implement a sensor operation check of the vehicle sensing devices 140a-140n used to determine the sensor detection area. If the vehicle sensing devices 140a-140n used to determine the sensor detection area fail the sensor operation check at 318, a sensor repair indication is generated at 320 and the method 300 proceeds to 314.

If the vehicle sensing devices 140a-140n used to determine the sensor detection area pass the sensor operation check at 318, the misbehavior detection module 208 is configured to determine whether the received V2V message passes the vehicle plausibility check based on the message-based vehicle data at 322.

If the misbehavior detection module 208 determines that the message-based vehicle data does not pass the vehicle plausibility check at 322, the method proceeds to 312 where the misbehavior detection module 208 implements the procedure associated with the identification of the V2V message as a malicious message as detailed above.

If at 322 the misbehavior detection module 208 determines that the message-based vehicle data has passed the vehicle plausibility check, at 324 the misbehavior detection module 208 is configured to determine whether a reputation score associated with the vehicle identifier of the source vehicle is greater than a reputation score threshold at 324.

The misbehavior detection module 208 requests a reputation score associated with the vehicle identifier in the V2V message from the SCMS 212 and identifies the V2V message as one of a legitimate message and a malicious message based on the received reputation score. The reputation score associated with a vehicle identifier is representative of historical behavior associated with the vehicle identifier. In an embodiment, the higher the number of malicious reports associated with a vehicle identifier, the lower the reputation score associated with that vehicle identifier. The misbehavior detection module 208 compares the received reputation score with the reputation score threshold. If the reputation score is higher than the reputation score threshold, the V2V message is identified as a legitimate message and the method 300 proceeds to 316. If the reputation score is lower than the reputation score threshold, the V2V message is identified as a malicious message and the method proceeds to 312.

In an embodiment, the misbehavior detection module 208 is configured to generate a reputation score based on the reputation score associated with the vehicle identifier received from the SCMS 212 and an assessment of historical source vehicle location data retrieved from the historical data module 206. The historical data module 206 stores historical vehicle location data associated vehicles that were previously detected by the vehicle sensor system 128. The misbehavior detection module 208 uses the historical vehicle location data to determine whether a source vehicle associated with the vehicle identifier in the V2V message was previously detected the vehicle sensor system 128. If the misbehavior detection module 208 determines that the vehicle sensor system 128 previously detected the source vehicle within the vehicle sensor detection area, the misbehavior detection module 208 generates a new higher reputation score for comparison with the reputation score threshold at 324.

Figure 4:
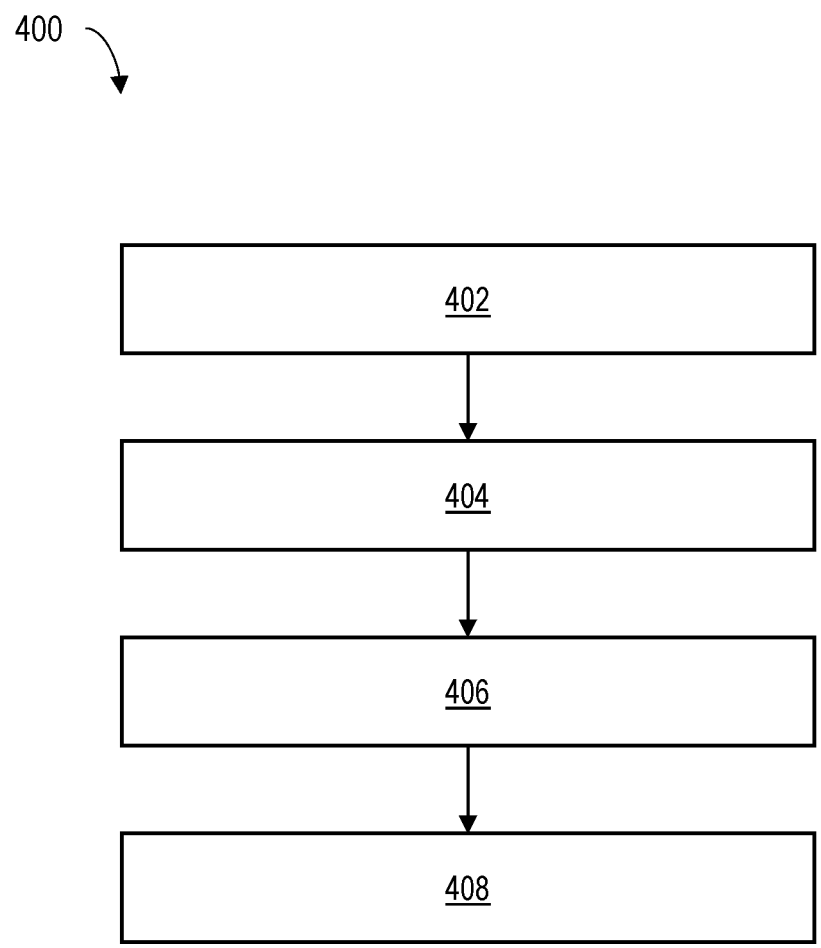
FIG. 4 is a flow chart representation of an embodiment of a method of detecting misbehavior at the ADS of an autonomous vehicle.

Referring to FIG. 4, a flow chart representation of an embodiment of a method 400 of detecting misbehavior at the ADS of an autonomous vehicle 100 is shown. The method 400 is performed by a controller 134 including an embodiment of a misbehavior detection system 110. The method 400 may be performed by the controller 134 in combination with other components of the autonomous vehicle 100. The method 400 may be performed by hardware circuitry, firmware, software, and/or combinations thereof. The method is described with reference to FIG. 2.

At 402 a V2V message including message-based vehicle data is received at the communication module 202. At 404, sensor data is received from at least one vehicle sensing device at the perception module 200. The misbehavior detection module 208 determines whether the V2V message is one of a legitimate message and a malicious message based at least in part on a comparison of the message-based vehicle data with sensor-based vehicle data generated based on the sensor data at 406. The processor 134 manages performance of the autonomous vehicle 100 in accordance with the message-based vehicle data based on the determination.

The use of a misbehavior detection systems 110 at autonomous vehicles 100 may facilitate the identification of sybil attacks by malicious or ghost vehicles based on a comparison of message-based vehicle data contained in received V2V messages with sensor-based vehicle data generated by the vehicle sensor system 128. The identification of sybil attacks by malicious entities may reduce the incorporation of malicious message-based vehicle data received via malicious V2V messages into the Intelligent Transportation System (ITS) of autonomous vehicles 100. The use of misbehavior detection systems 110 at autonomous vehicles 100 may assist with the removal of misbehaving or malicious entities from the V2X ecosystem thereby protecting the autonomous vehicles 100 as well as the overall the autonomous vehicle system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

What is claimed is:

1. An automated driving system (ADS) of an autonomous vehicle including a misbehavior detection system, comprising:
 a communication module configured to receive a vehicle-to-vehicle (V2V) message comprising message-based vehicle data;
 a perception module configured to receive sensor data from at least one vehicle sensing device;
 a misbehavior detection module configured to determine whether the V2V message is one of a legitimate message and a malicious message based at least in part on a comparison of the message-based vehicle data with sensor-based vehicle data generated based on the sensor data; and a processor configured to manage performance of the autonomous vehicle in accordance with the message-based vehicle data based on the determination, wherein the message-based vehicle data comprises a vehicle location of a source vehicle of the V2V message, and the misbehavior detection module is configured to:

determine whether the vehicle location of the source vehicle is disposed within a sensor detection area associated with the at least one vehicle sensing device; and compare a reputation score received from a security credentials management system (SCMS) and associated with a vehicle identifier associated with the V2V message with a reputation score threshold to identify whether the V2V message is one of the legitimate message and the malicious message based on the determination.

2. The system of claim 1, wherein the misbehavior detection module is configured to determine whether the V2V message is one of the legitimate message and the malicious message based at least in part on performance of a plausibility check of the message-based vehicle data.

3. The system of claim 1, wherein the misbehavior detection module is configured to:

and perform a sensor operation check of the at least one vehicle sensing device based on the determination of whether the vehicle location of the source vehicle is disposed within the sensor detection area associated with the at least one vehicle sensing device.

4. The system of claim 1, wherein the misbehavior detection module is configured to:

compare the vehicle location of the source vehicle received in the V2V message with historical source vehicle location data to identify whether the V2V message is one of the legitimate message and the malicious message based on the determination of whether the vehicle location of the source vehicle is disposed within the sensor detection area associated with the at least one vehicle sensing device.

5. The system of claim 1, wherein upon a determination that the V2V message is the malicious message, a misbehavior reporting module is configured to report the vehicle identifier associated with the V2V message to the SCMS.

6. A non-transitory computer readable medium comprising instructions stored thereon for detection of misbehavior at an automated driving system (ADS), that upon execution by a processor, cause the processor to:

receive a vehicle-to-vehicle (V2V) message comprising message-based vehicle data;

receive sensor data received from at least one vehicle sensing device;

determine whether the V2V message is one of a legitimate message and a malicious message based at least in part on a comparison of the message-based vehicle data with sensor-based vehicle data generated based on the sensor data;

manage performance of an autonomous vehicle in accordance with the message-based vehicle data based on the determination;

determine whether a vehicle location of a source vehicle is disposed within a sensor detection area associated with the at least one vehicle sensing device, the message-based vehicle data comprising the vehicle location of the source vehicle of the V2V message; and compare a reputation score received from a security credentials management system (SCMS) and associated with a vehicle identifier associated with the V2V message with a reputation score threshold to identify whether the V2V message is one of the legitimate message and the malicious message based on the determination.

7. The non-transitory computer readable medium of claim 6, further comprising instructions to cause the processor to determine whether the V2V message is one of the legitimate message and the malicious message based at least in part on a comparison of the message-based vehicle data with the sensor-based vehicle data generated based on the sensor data, the message-based vehicle data comprising the vehicle location of the source vehicle of the V2V message and the sensor-based vehicle data comprising a sensor-based vehicle location of the source vehicle based on the sensor data.

8. The non-transitory computer readable medium of claim 6, further comprising instructions to cause the processor to determine whether the V2V message is one of the legitimate message and the malicious message based at least in part on performance of a plausibility check of the message-based vehicle data.

9. The non-transitory computer readable medium of claim 6, further comprising instructions to cause the processor to:

perform a sensor operation check of the at least one vehicle sensing device based on the determination of whether the vehicle location of the source vehicle is disposed within the sensor detection area associated with the at least one vehicle sensing device.

10. The non-transitory computer readable medium of claim 6, further comprising instructions to cause the processor to:

compare the vehicle location of the source vehicle received in the V2V message with historical source vehicle location data to identify whether the V2V message is one of the legitimate message and the malicious message based on the determination.

11. The non-transitory computer readable medium of claim 6, further comprising instructions to cause the processor to upon a determination that the V2V message is the malicious message, report the vehicle identifier associated with the V2V message to the SCMS.

12. A method of detecting misbehavior at an automated driving system (ADS) comprising:

receiving a vehicle-to-vehicle (V2V) message comprising message-based vehicle data at a communication module;

receiving sensor data received from at least one vehicle sensing device at a perception module;

determining whether the V2V message is one of a legitimate message and a malicious message based at least in part on a comparison of the message-based vehicle data with sensor-based vehicle data generated based on the sensor data at a misbehavior detection module;

managing performance of an autonomous vehicle in accordance with the message-based vehicle data based on the determination;

determining whether a vehicle location of a source vehicle is disposed within a sensor detection area associated with the at least one vehicle sensing device, the message-based vehicle data comprising the vehicle location of the source vehicle of the V2V message; and comparing a reputation score received from a security credentials management system (SCMS) and associated with a vehicle identifier associated with the V2V message with a reputation score threshold to identify whether the V2V message is one of the legitimate message and the malicious message based on the determination.

13. The method of claim 12, further comprising determining whether the V2V message is one of the legitimate message and the malicious message based at least in part on a comparison of the message-based vehicle data with the sensor-based vehicle data generated based on the sensor data, the message-based vehicle data comprising the vehicle location of the source vehicle of the V2V message and the sensor-based vehicle data comprising a sensor-based vehicle location of the source vehicle based on the sensor data.

14. The method of claim 12, further comprising determining whether the V2V message is one of the legitimate message and the malicious message based at least in part on performance of a plausibility check of the message-based vehicle data.

15. The method of claim 12, further comprising:
performing a sensor operation check of the at least one vehicle sensing device based on the determination of whether the vehicle location of the source vehicle is disposed within the sensor detection area associated with the at least one vehicle sensing device.

16. The method of claim 12, further comprising:
comparing the vehicle location of the source vehicle received in the V2V message with historical source vehicle location data to identify whether the V2V message is one of the legitimate message and the malicious message based on the determination of whether the vehicle location of the source vehicle is disposed within the sensor detection area associated with the at least one vehicle sensing device.

* * * * *